United States Patent
Kuronuma et al.

(10) Patent No.: US 12,428,781 B2
(45) Date of Patent: Sep. 30, 2025

(54) INKJET RECORDING METHOD

(71) Applicants: Makoto Kuronuma, Kanagawa (JP); Toshiyuki Kobashi, Tokyo (JP); Tomohiro Hirade, Kanagawa (JP)

(72) Inventors: Makoto Kuronuma, Kanagawa (JP); Toshiyuki Kobashi, Tokyo (JP); Tomohiro Hirade, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 167 days.

(21) Appl. No.: 18/461,145

(22) Filed: Sep. 5, 2023

(65) Prior Publication Data

US 2024/0102237 A1    Mar. 28, 2024

(30) Foreign Application Priority Data

Sep. 9, 2022 (JP) ............................... 2022-143948
Jul. 6, 2023 (JP) ............................... 2023-111609

(51) Int. Cl.
*D06P 5/30* (2006.01)
*B41J 2/21* (2006.01)
(Continued)

(52) U.S. Cl.
CPC .............. *D06P 5/30* (2013.01); *B41J 2/2117* (2013.01); *B41J 3/4078* (2013.01); *B41M 1/26* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2006/0207488 A1* 9/2006 Haas ..................... B63B 21/50
114/267
2007/0067928 A1* 3/2007 Ellis ..................... C09D 11/322
8/445
(Continued)

FOREIGN PATENT DOCUMENTS

JP    2019-035057 A    3/2019
JP    2021-059808 A    4/2021
(Continued)

OTHER PUBLICATIONS

Gotou et al., U.S. Appl. No. 18/187,895, filed Mar. 22, 2023.
(Continued)

*Primary Examiner* — Manish S Shah
(74) *Attorney, Agent, or Firm* — Grüneberg and Myers PLLC (57) ABSTRACT

An inkjet recording method is provided that includes the following steps: applying a pretreatment liquid to a fabric; applying a first white ink by an inkjet method and a wet on wet method onto an application region of the pretreatment liquid obtained in the applying of the pretreatment liquid, to form an image; applying a second white ink by an inkjet method and a wet on wet method onto the image formed in the applying of the first white ink; and applying a color ink by an inkjet method and a wet on wet method onto an image obtained in the applying of the second white ink.

8 Claims, 2 Drawing Sheets (51) Int. Cl.
*B41J 3/407* (2006.01)
*B41M 1/26* (2006.01)
*C09D 11/102* (2014.01)
*C09D 11/30* (2014.01)
*C09D 11/54* (2014.01)
*D06P 1/52* (2006.01)
*D06P 5/00* (2006.01)

(52) U.S. Cl.
CPC ............ *C09D 11/102* (2013.01); *C09D 11/30* (2013.01); *C09D 11/54* (2013.01); *D06P 1/5278* (2013.01); *D06P 5/002* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/326; C09D 11/107; C09D 11/03; C09D 11/037; C09D 11/033; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS

| | | | | |
|---|---|---|---|---|
| 2011/0102497 | A1* | 5/2011 | Sato | C09D 11/54 |
| | | | | 347/21 |
| 2011/0184108 | A1* | 7/2011 | Okuda | C09D 11/322 |
| | | | | 524/507 |
| 2011/0200751 | A1* | 8/2011 | Yatake | C09D 11/54 |
| | | | | 427/261 |
| 2012/0019579 | A1* | 1/2012 | Usuda | B41J 2/2117 |
| | | | | 347/12 |
| 2015/0054885 | A1* | 2/2015 | Sugiyama | D06P 1/525 |
| | | | | 347/21 |
| 2017/0267889 | A1* | 9/2017 | Katsuragi | B41J 2/01 |
| 2017/0349772 | A1 | 12/2017 | Hirade et al. | |
| 2019/0031897 | A1 | 1/2019 | Hirade et al. | |
| 2019/0284421 | A1 | 9/2019 | Sekiguchi et al. | |
| 2020/0023648 | A1* | 1/2020 | Gotou | B41J 2/145 |
| 2020/0101782 | A1 | 4/2020 | Sekiguchi et al. | |
| 2020/0276849 | A1 | 9/2020 | Urano et al. | |
| 2021/0116286 | A1 | 4/2021 | Kobashi et al. | |
| 2021/0198509 | A1 | 7/2021 | Sekiguchi et al. | |
| 2021/0301156 | A1 | 9/2021 | Hirade et al. | |
| 2021/0395552 | A1* | 12/2021 | Hongo | C09D 11/322 |
| 2022/0024220 | A1 | 1/2022 | Kudo et al. | |
| 2022/0282107 | A1 | 9/2022 | Ozaki et al. | |
| 2022/0289993 | A1 | 9/2022 | Ozaki et al. | |
| 2022/0298373 | A1 | 9/2022 | Gotou et al. | |
| 2023/0132661 | A1 | 5/2023 | Gotou et al. | |

FOREIGN PATENT DOCUMENTS

| | | |
|---|---|---|
| JP | 2022-049649 A | 3/2022 |
| JP | 2022-134095 A | 9/2022 |
| WO | 2022/058819 | 3/2022 |

OTHER PUBLICATIONS

Kobashi et al., U.S. Appl. No. 18/187,071, filed Mar. 21, 2023.
Ozaki et al., U.S. Appl. No. 18/184,887, filed Mar. 16, 2023.
Extended European Search Report dated Jan. 18, 2024, in European Patent Application No. 23196384.4, 7 pages.

* cited by examiner

INKJET RECORDING METHOD

CROSS-REFERENCE TO RELATED APPLICATIONS

This patent application is based on and claims priority pursuant to 35 U.S.C. § 119(a) to Japanese Patent Application Nos. 2022-143948 and 2023-111609, filed on Sep. 9, 2022 and Jul. 6, 2023, respectively, in the Japan Patent Office, the entire disclosure of each of which is hereby incorporated by reference herein.

BACKGROUND

Technical Field

The present disclosure relates to an inkjet recording method.

Related Art

An inkjet recording method is a recording method in which ink droplets are discharged from fine nozzles and deposited on a recording medium to form characters and images. In recent years, inkjet textile printing, in which a fabric is used as a recording medium, is widely used. Inks used in inkjet printers include pigment ink and dye ink. Inkjet textile printing using pigment ink does not require washing with water after coloring, which is necessary when printing with dye ink. Therefore, inkjet textile printing using pigment ink is an excellent recording method, because no waste water is produced.

When white ink is applied to a fabric, the whiteness decreases as bleed-through of the ink occurs.

SUMMARY

An inkjet recording method according to an embodiment of the present invention includes:
applying a pretreatment liquid to a fabric;
applying a first white ink by an inkjet method and a WOW method onto an application region of the pretreatment liquid obtained in the applying of the pretreatment liquid, to form an image;
applying a second white ink by an inkjet method and a WOW method onto the image formed in the applying of the first white ink; and
applying a color ink by an inkjet method and a WOW method onto an image obtained in the applying of the second white ink.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present invention are described below. As used herein, the singular forms "a," "an," and "the" are intended to include the plural forms as well, unless the context clearly indicates otherwise.

Below, aspects of implementing the present invention will be described in detail. It is noted that the present invention is not limited to the following embodiments, and may be implemented by including various modifications within the scope of the present invention.

The inkjet recording method according to an embodiment of the present invention forms, with a fabric, a recorded matter having high white concealing properties, high abrasion resistance, and little stickiness in its image portion.

In the present disclosure, the term "inkjet recording" refers to recording (printing) of ink on fabric, which is one type of recording medium, by utilizing an inkjet method. A "recorded matter" refers to a matter obtained by recording ink on a recording medium to form an image thereon. In the present disclosure, a "WET ON WET method (hereinafter "WOW method")" refers to a method that performs a step ("application step") of applying a subsequent ink in a wet state (i.e., a state where liquid is transferred by means of pressing such as contacting).

The WOW method is preferably a method that does not include a drying step between application steps. Here, the drying process in the drying step may include heating and air blowing, but does not include natural drying.

In the present disclosure, the "inkjet recording" may be referred to as "inkjet textile printing", and the "recorded matter" used in the inkjet recording may be referred to as "printed matter".

The inkjet recording method according to an embodiment of the present invention will be described below.

Figure 3:
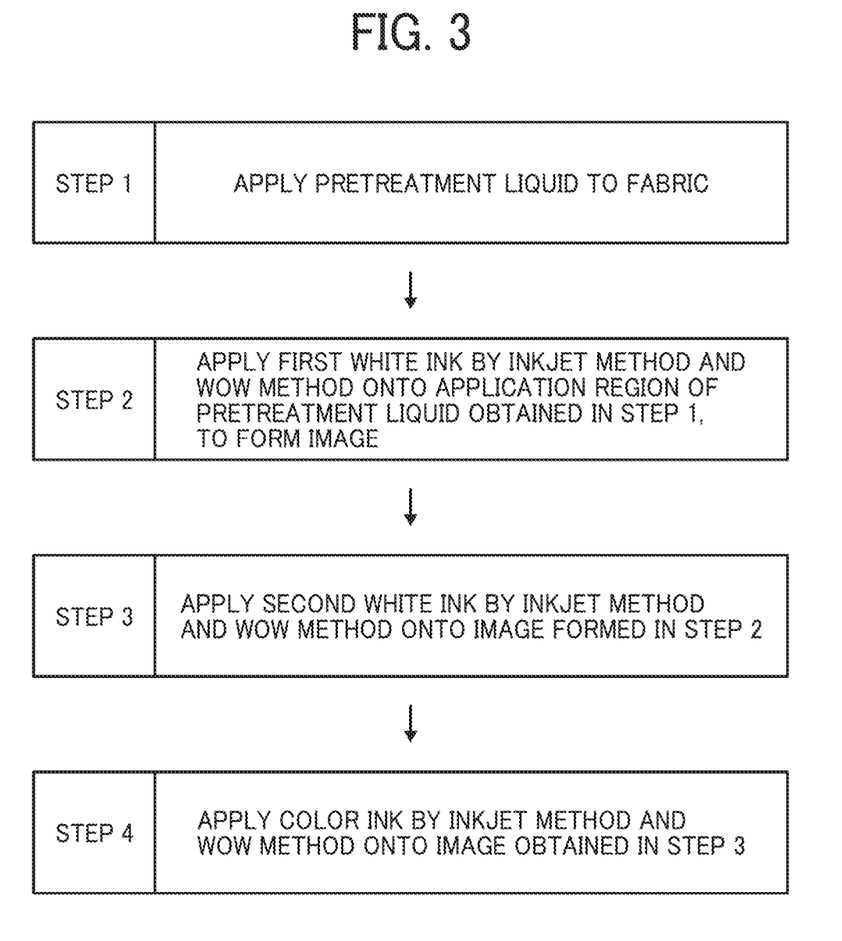
FIG. 3 is a diagram illustrating an inkjet recording method according to an embodiment of the present invention.

As illustrated in FIG. 3, the inkjet recording method of the present embodiment includes the following steps.

Step 1: A step of applying a pretreatment liquid to a fabric.

Step 2: A step of applying a first white ink by an inkjet method and a WOW method onto an application region of the pretreatment liquid obtained in step 1, to form an image.

Step 3: A step of applying a second white ink by an inkjet method and a WOW method onto the image formed in step 2.

Step 4: A step of applying a color ink by an inkjet method and a WOW method onto an image obtained in step 3.

By applying the pretreatment liquid to the fabric in step 1, a surface of the fabric, which is a recording medium, can be formed into a smooth surface and the adhesiveness of the white ink to the recording medium can be improved.

In step 2, the first white ink is applied onto the application region of the pretreatment liquid, and in step 3, the second ink is applied onto the image formed with the first white ink.

Thus, in the present embodiment, white ink is applied in two steps.

To improve the concealability of white ink, it is preferable to increase the deposition amount of white ink.

When white ink in an amount desired for securing white concealing properties is applied in one step, the white concealing properties are improved, but the stickiness of the image remains.

In the present embodiment, white ink is applied in two steps as described above. Therefore, compared with a case where white ink is applied in one step, the amount of the second white ink applied in step 3 can be reduced, and the stickiness of the image can be reduced.

The first white ink is applied to the fabric smoothened by application of the pretreatment liquid, and thus, the adhesiveness between the recording medium and the ink is improved. Further, the second white ink can improve the rubbing fastness and reduce the stickiness of the image.

The first white ink and the second white ink contain different components.

The first white ink preferably contains a polymer having a carbodiimide group or an oxazoline group, because in this case, the adhesiveness to the second white ink is improved. More preferably, the proportion of the polymer having a carbodiimide group or an oxazoline group in the first white ink is 1 mass % or more and 6 mass % or less.

The second white ink preferably contains a urethane resin as a resin having a carboxy group to improve reactivity with a cross-linking agent contained in the first white ink. Preferably, the proportion of the urethane resin in the second white ink is 10 mass % or more and 14 mass % or less.

Further, a dried ink film of the second white ink preferably has a glass transition temperature of 30° C. or less to improve the texture.

<Glass Transition Temperature>

The glass transition temperature of the dried film of the second white ink is measured using a DSC system Q-2000 (manufactured by TA Instruments). Specifically, the ink is heated and dried in an oven at 70° C. for 12 hours or longer and at 150° C. for 3 hours to form an ink film. Next, 5 mg of the ink film are placed in a sample container made of aluminum. The sample container is set in the device mentioned above, and measurement is performed under a nitrogen stream and the following measurement conditions (1) to (4). The glass transition temperature is determined by the midpoint method by selecting a DSC curve i the second temperature increase.

(1) Cool to −70° C. and then hold for 5 minutes
(2) Increase temperature to 120° C. at 10° C./min
(3) Cool to −70° C. and then hold for 5 minutes
(4) Increase temperature to 120° C. at 10° C./min The ink used in the present embodiment contains water, an organic solvent, a cross-linking agent, a sizing agent, and an aggregating agent.

The components of the ink used in the present embodiment are described below.

<Organic Solvent>

The organic solvent used in the present embodiment is not particularly limited and water-soluble organic solvents may be used. Examples of the organic solvent include, but are not limited to, polyhydric alcohols, ethers such as polyhydric alcohol alkyl ethers and polyhydric alcohol aryl ethers, nitrogen-containing heterocyclic compounds, amides, amines, and sulfur-containing compounds.

Specific examples of the water-soluble organic solvents include, but are not limited to, polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and pentanetriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethylpropionamide, and 3-butoxy-N,N-dimethylpropionamide; amines such as monoethanolamine, diethanolamine, and triethylamine; sulfur-containing compounds such as dimethyl sulfoxide, sulfolane, and thiodiethanol; propylene carbonate; and ethylene carbonate.

It is preferable to use an organic solvent having a boiling point of 250° C. or below, because such an organic solvent not only functions as a wetting agent, but also provides good drying properties.

Polyol compounds having 8 or more carbon atoms and glycol ether compounds may also be suitably used as the organic solvent. Specific examples of the polyol compounds having 8 or more carbon atoms include, but are not limited to, 2-ethyl-1,3-hexanediol and 2,2,4-trimethyl-1,3-pentanediol.

Specific examples of the glycol ether compounds include, but are not limited to, polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyhydric alcohol aryl ethers such as ethylene glycol monophenyl ether and ethylene glycol monobenzyl ether.

The polyol compounds having 8 or more carbon atoms and the glycol ether compounds improve the penetrability of the ink, which is advantageous when paper is used as a recording medium.

A content of the organic solvent in the ink is not particularly limited and may be appropriately selected according to a purpose, but is preferably 10 mass % or more and 60 mass % or less, and more preferably 20 mass % or more and 60 mass % or less, from the viewpoint of the drying properties and the discharge reliability of the ink.

<Water>

The water content in the ink is not particularly limited and may be appropriately selected according to a purpose, but is preferably 10 mass % or more and 90 mass % or less, and more preferably 20 mass % or more and 60 mass % or less, from the viewpoint of the drying properties and discharge reliability of the ink.

<Colorant>

The colorant is not particularly limited, and pigments and dyes can be used.

The pigments include both inorganic pigments and organic pigments. Each of these types of pigments may be used alone or in combination with others. Mixed crystals may also be used as the pigments.

Examples of the pigments that may be used include, but are not limited to, black pigments, yellow pigments, magenta pigments, cyan pigments, white pigments, green pigments, orange pigments, glossy pigments such as gold and silver, and metallic pigments.

Examples of the inorganic pigments that may be used include, but are not limited to, titanium oxide, iron oxide, calcium carbonate, barium sulfate, aluminum hydroxide, Barium Yellow, Cadmium Red, Chrome Yellow, and carbon blacks prepared by a known method such as a contact method, a furnace method, and a thermal method.

Examples of the organic pigments that may be used include, but are not limited to, azo pigments, polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (for example, basic dye chelates and acid dye chelates), nitro pigments, nitroso pigments, and aniline black. Among these pigments, it is preferable to use pigments having good affinity with solvents. In addition, it is also possible to use hollow resin particles or hollow inorganic particles.

Specific examples of white color pigments include, but are not limited to, titanium oxide, iron oxide, calcium carbonate, barium sulfate, and aluminum hydroxide. Examples of black color pigments include, but are not limited to, carbon blacks (C.I. Pigment Black 7) such as furnace black, lamp black, acetylene black, and channel black, or metals such as copper, iron (C.I. Pigment Black 11), and titanium oxide, and organic pigments such as aniline black (C.I. Pigment Black 1).

Examples of pigments used for color printing include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, 213, C.I. Pigment Orange 5, 13, 16, 17, 36, 43, 51, C.I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Bengala), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, 264, C.I. Pigment Violet 1 (Rhodamine Lake), 3, 5:1, 16, 19, 23, 38, C.I. Pigment Blue 1, 2, 15 (Phthalocyanine Blue), 15:1, 15:2, 15:3, 15:4 (Phthalocyanine Blue), 16, 17:1, 56, 60, 63, and C.I. Pigment Green 1, 4, 7, 8, 10, 17, 18, 36.

The dyes are not particularly limited, and acid dyes, direct dyes, reactive dyes, and basic dyes may be used. Each of these types of dyes may be used alone or in combination with others.

Examples of the dyes include, but are not limited to, C.I. Acid Yellow 17, 23, 42, 44, 79, 142, C.I. Acid Red 52, 80, 82, 249, 254, 289, C.I. Acid Blue 9, 45, 249, C.I. Acid Black 1, 2, 24, 94, C. I. Food Black 1, 2, C.I. Direct Yellow 1, 12, 24, 33, 50, 55, 58, 86, 132, 142, 144, 173, C.I. Direct Red 1, 4, 9, 80, 81, 225, 227, C.I. Direct Blue 1, 2, 15, 71, 86, 87, 98, 165, 199, 202, C.I. Direct Black 19, 38, 51, 71, 154, 168, 171, 195, C.I. Reactive Red 14, 32, 55, 79, 249, and C.I. Reactive Black 3, 4, 35.

The content of the colorant in the ink is preferably 0.1 mass % or more and 15 mass % or less, and more preferably 1 mass % or more and 10 mass % or less, from the viewpoint of improving image density and achieving good fixability and discharge stability.

Examples of methods of dispersing the pigment to obtain the ink include, but are not limited to, a method of introducing a hydrophilic functional group into a pigment to obtain a self-dispersing pigment, a method of coating the surface of a pigment with a resin to disperse the pigment, and a method of dispersing a pigment by using a dispersant.

Examples of the method of introducing a hydrophilic functional group into a pigment to obtain a self-dispersing pigment include, but are not limited to, a method of adding a functional group such as a sulfone group and a carboxyl group to a pigment (for example, carbon) to obtain a pigment that is dispersible in water.

Examples of the method of coating the surface of a pigment with a resin to disperse the pigment include, but are not limited to, a method of encapsulating the pigment in a microcapsule to obtain a pigment that is dispersible in water. Such a pigment may be referred to as a resin-coated pigment. In this case, it is not required that all pigments blended in the ink are coated with the resin, and pigments that are not coated with the resin and pigments that are partially coated with the resin may be dispersed in the ink, as long as the effects of the present embodiment are not impaired.

Examples of the method of dispersing a pigment by using a dispersant include, but are not limited to, a method of dispersing a pigment by using a known dispersant having low molecular weight or a known dispersant having high molecular weight, which are represented by a surfactant.

The dispersant may be selected according to the pigment, and anionic surfactants, cationic surfactants, amphoteric surfactants, and nonionic surfactants may be used as the dispersant.

For example, RT-100 manufactured by Takemoto Oil & Fat Co., Ltd. (a nonionic surfactant) and a sodium naphthalenesulfonate formalin condensate may also be suitably used as the dispersant.

Each of these dispersants may be used alone or in combination with others.

<Pigment Dispersion>

The ink may be obtained by mixing a pigment with materials such as water and an organic solvent. The ink may also be manufactured by mixing a pigment with other materials such as water and a dispersant to prepare a pigment dispersion, and then, mixing the pigment dispersion with materials such as water and an organic solvent to manufacture the ink.

The pigment dispersion is obtained by mixing water, a pigment, a pigment dispersant, and other components if desired, to disperse the pigment, and adjusting the particle diameter of the pigment. The pigment may be dispersed by using a disperser.

The particle diameter of the pigment in the pigment dispersion is not particularly limited. However, from the viewpoint of achieving good dispersion stability of the pigment and enhancing the discharge stability and the image quality such as the image density, the maximum frequency of the particle diameter obtained by maximum number conversion is preferably 20 nm or more and 500 nm or less, and more preferably 20 nm or more and 150 nm or less. The particle diameter of the pigment may be measured by using a particle size analyzer (NANOTRAC WAVE-UT151, manufactured by MicrotracBEL Corp.).

The content of the pigment in the pigment dispersion is not particularly limited and may be appropriately selected according to a purpose, but is preferably 0.1 mass % or more and 50 mass % or less, and more preferably 0.1 mass % or more and 30 mass % or less, from the viewpoint of achieving a good discharge stability and increasing the image density.

It is preferable to filter the pigment dispersion by using, if desired, a filter or a centrifugal separator to remove coarse particles, followed by degassing of the pigment dispersion.
<Resin>

The type of the resin contained in the ink is not particularly limited and can be appropriately selected according to a purpose. Examples of the resin include, but are not limited to, urethane resins, polyester resins, acrylic resins, vinyl acetate resins, styrene resins, butadiene resins, styrene-butadiene resins, vinyl chloride resins, acrylic styrene resins, and acrylic silicone resins.

Resin particles formed of these resins may also be used. The ink can be obtained by mixing a resin emulsion in which resin particles are dispersed in water as a dispersion medium, with materials such as a colorant or an organic solvent. The resin particles may be appropriately synthesized or may be a commercially available product. These resin particles may be used alone, or two or more types of resin particles may be used in combination.

The volume average particle diameter of the resin particles is not particularly limited and may be appropriately selected according to a purpose, but is preferably 10 nm or more and 1000 nm or less, more preferably 10 nm or more and 200 nm or less, and particularly preferably 10 nm or more and 100 nm or less, from the viewpoint of achieving good fixability and high image hardness.

The volume average particle diameter may be measured by using a particle size analyzer (NANOTRAC WAVE-UT151, manufactured by MicrotracBEL Corp.).

A content of the resin is not particularly limited and may be appropriately selected according to a purpose, but is preferably 1 mass % or more and 30 mass % or less, and more preferably 5 mass % or more and 20 mass % or less, with respect to the total amount of ink, from the viewpoint of fixability and storage stability of the ink.

The particle diameter of solid contents in the ink is not particularly limited and may be appropriately selected according to a purpose, but the maximum frequency of the particle diameter obtained by maximum number conversion is preferably 20 nm or more and 1000 nm or less, and more preferably 20 nm or more and 150 nm or less, from the viewpoint of enhancing the discharge stability and the image quality such as the image density. The solid contents include the resin particles and the pigment particles. The particle diameter of the solid contents may be measured by using a particle size analyzer (NANOTRAC WAVE-UT151, manufactured by MicrotracBEL Corp.).

The second white ink preferably contains a resin having a carboxy group. The resin having a carboxy group is preferably a urethane resin that has good reactivity with a cross-linking agent contained in the first white ink.
<Additive>

The ink may contain a surfactant, a defoaming agent, a preservative/antifungal agent, a rust inhibitor, and a pH adjuster, if desired.
<Surfactant>

Surfactants that may be used include, but are not limited to, silicone-based surfactants, fluorine-based surfactants, amphoteric surfactants, nonionic surfactants, and anionic surfactants.

The silicone-based surfactants are not particularly limited and may be appropriately selected according to a purpose. It is preferable to use a silicone-based surfactant that does not decompose at a high pH and examples of such a silicone-based surfactant include, but are not limited to, polydimethylsiloxane modified in a side chain, polydimethylsiloxane modified at both ends, polydimethylsiloxane modified at one end, and polydimethylsiloxane modified in a side chain and at both ends. In particular, silicone-based surfactants including a polyoxyethylene group and/or a polyoxyethylene polyoxypropylene group as the modifying group are preferred, because such surfactants exhibit good properties as aqueous surfactants. Examples of the silicone-based surfactants further include, but are not limited to, polyether-modified silicone-based surfactants such as a compound in which a polyalkylene oxide structure is introduced into a side chain of a Si-part in dimethylsiloxane.

As the fluorine-based surfactants, perfluoroalkyl sulfonic acid compounds, perfluoroalkyl carboxylic acid compounds, perfluoroalkyl phosphoric acid ester compounds, perfluoroalkyl ethylene oxide adducts, and polyoxyalkylene ether polymer compounds having a perfluoroalkyl ether group in a side chain are particularly preferable, because these compounds have weak foamability. Examples of the perfluoroalkyl sulfonic acid compounds include, but are not limited to, perfluoroalkyl sulfonic acid and perfluoroalkyl sulfonate. Examples of the perfluoroalkyl carboxylic acid compounds include, but are not limited to, perfluoroalkyl carboxylic acid and perfluoroalkyl carboxylate. Examples of the polyoxyalkylene ether polymer compounds having a perfluoroalkyl ether group in a side chain include, but are not limited to, sulfuric ester salts of polyoxyalkylene ether polymers having a perfluoroalkyl ether group in a side chain, and salts of polyoxyalkylene ether polymers having a perfluoroalkyl ether group in a side chain. Examples of counter ions for the salts in these fluorine-based surfactants include, but are not limited to, Li, Na, K, $NH_4$, $NH_3CH_2CH_2OH$, $NH_2(CH_2CH_2OH)_2$, and $NH(CHCH_2OH)_3$.

Examples of the amphoteric surfactants include, but are not limited to, laurylaminopropionate, lauryl dimethyl betaine, stearyl dimethyl betaine, and lauryl dihydroxyethyl betaine.

Examples of the nonionic surfactants include, but are not limited to, polyoxyethylene alkyl phenyl ethers, polyoxyethylene alkyl esters, polyoxyethylene alkylamines, polyoxyethylene alkylamides, polyoxyethylene propylene block polymers, sorbitan fatty acid esters, polyoxyethylene sorbitan fatty acid esters, and ethylene oxide adducts of acetylene alcohol.

Examples of the anionic surfactants include, but are not limited to, polyoxyethylene alkyl ether acetate, dodecylbenzene sulfonate, laurates, and salts of polyoxyethylene alkyl ether sulfate.

Each of these anionic surfactants may be used alone or in combination with others.

The silicone-based surfactants are not particularly limited and may be appropriately selected according to a purpose. Examples of the silicone-based surfactants include, but are not limited to, polydimethylsiloxane modified in a side chain, polydimethylsiloxane modified at both ends, polydimethylsiloxane modified at one end, and polydimethylsiloxane modified in a side chain and at both ends. In particular, polyether-modified silicone-based surfactants including a polyoxyethylene group and/or a polyoxyethylene polyoxypropylene group as the modifying group are preferred, because such surfactants exhibit good properties as aqueous surfactants.

Such surfactants may be appropriately synthesized or may be commercially available products. For example, commercially available products of such surfactants include products from BYK-Chemie Co., Ltd., Shin-Etsu Chemical Co., Ltd., Dow Corning Toray Silicone Co., Ltd., Nihon Emulsion Co., Ltd., and Kyoeisha Chemical Co., Ltd.

The polyether-modified silicone-based surfactant is not particularly limited and may be appropriately selected according to a purpose. Examples of the polyether-modified silicone-based surfactant include, but are not limited to, a compound represented by General Formula (S-1) in which a polyalkylene oxide structure is introduced into the side chain of the Si-part in dimethylpolysiloxane.

General Formula (S-1)

(in General Formula (S-1), each of m, n, a, and b in the formula independently represent an integer, R represents an alkylene group, and R' represents an alkyl group)

Commercially available products may be used as the polyether-modified silicone-based surfactants and examples thereof include, but are not limited to, KF-618, KF-642, and KF-643 (Shin-Etsu Chemical Co., Ltd.), EMALEX-SS-5602 and SS-1906EX (Nihon Emulsion Co., Ltd.), FZ-2105, FZ-2118, FZ-2154, FZ-2161, FZ-2162, FZ-2163, and FZ-2164 (Dow Corning Toray Silicone Co., Ltd.), BYK-33 and BYK-387 (BYK-Chemie Co., Ltd.), and TSF4440, TSF4452, and TSF4453 (Toshiba Silicon Co., Ltd.).

The fluorine-based surfactant is preferably a compound having 2 to 16 fluorine-substituted carbon atoms, and more preferably a compound having 4 to 16 fluorine-substituted carbon atoms.

Examples of the fluorine-based surfactant include, but are not limited to, perfluoroalkyl phosphoric acid ester compounds, perfluoroalkyl ethylene oxide adducts, and polyoxyalkylene ether polymer compounds having a perfluoroalkyl ether group in a side chain. Among these, polyoxyalkylene ether polymer compounds having a perfluoroalkyl ether group in a side chain are preferred, because these compounds have a low foaming property, and fluorine-based surfactants represented by General Formula (F-1) and General Formula (F-2) below are particularly preferred.

General Formula (F-1)

In the compound represented by General Formula (F-1) above, m is preferably an integer from 0 to 10 and n is preferably an integer from 0 to 40, to improve the water solubility.

General Formula (F-2)

In the compound represented by General Formula (F-2) above, Y represents H, or $C_mF_{2m+1}$, where m is an integer from 1 to 6, or $CH_2CH(OH)CH_2-C_mF_{2m+1}$, where m is an integer from 4 to 6, or $C_pH_{2p+1}$, where p is an integer from 1 to 19. In the compound, n represents an integer from 1 to 6. Further, a represents an integer from 4 to 14.

Commercially available products may be used as the fluorine-based surfactants. Examples of commercially available fluorine-based surfactants include, but are not limited to, SURFLON S-111, S-112, S-113, S-121, S-131, S-132, S-141, and S-145 (products of Asahi Glass Co., Ltd.); FLUORAD FC-93, FC-95, FC-98, FC-129, FC-135, FC-170C, FC-430, and FC-431 (products of Sumitomo 3M Limited); MEGAFACE F-470, F-1405, and F-474 (products of DIC Corporation); ZONYL TBS, FSP, FSA, FSN-100, FSN, FSO-100, FSO, FS-300, UR, CAPSTONE FS-30, FS-31, FS-3100, FS-34, and FS-35 (products of Chemours Company); FT-110, FT-250, FT-251, FT-400S, FT-150, and FT-400SW (products of NEOS Co., Ltd.); POLYFOX PF-136A, PF-156A, PF-151N, PF-154, and PF-159 (products of OMNOVA Solutions Inc.); and UNIDYNE DSN-403N (product of Daikin Industries, Ltd.). Among these, for improving printing quality, in particular color developing properties, paper penetrability, paper wettability, and uniform dying properties, FS-3100, FS-34, and FS-300 manufactured by Chemours Company, FT-110, FT-250, FT-251, FT-400S, FT-150, and FT-400SW manufactured by NEOS Co., Ltd., POLYFOX PF-151N manufactured by OMNOVA Solutions Inc., and UNIDYNE DSN-403N manufactured by Daikin Industries, Ltd. are particularly preferred.

A content of the surfactant in the ink is not particularly limited and may be appropriately selected according to a purpose, but is preferably 0.001 mass % or more and 5 mass % or less, and more preferably 0.05 mass % or more and 5 mass % or less, from the viewpoint of excellent wettability, discharge stability, and improved image quality.

<Defoaming Agent>

The defoaming agent is not particularly limited, and examples of the defoaming agent include, but are not limited to, silicone-based defoaming agents, polyether-based defoaming agents, and fatty acid ester-based defoaming agents. Each of these defoaming agents can be used alone or in combination with others. Among these defoaming agents, silicone-based defoaming agents have excellent defoaming ability, and thus are preferred.

<Preservative/Antifungal Agent>

The preservative/antifungal agent is not particularly limited, and examples thereof include, but are not limited to, 1,2-benzisothiazolin-3-one.

<Rust Inhibitor>

The rust inhibitor is not particularly limited, and examples thereof include, but are not limited to, acidic sulfites and sodium thiosulfate.

<pH Adjuster>

The pH adjuster is not particularly limited as long as the pH adjuster adjusts the pH to 7 or higher. Examples of the pH adjuster include, but are not limited to, amines such as diethanolamine and triethanolamine.

<Cross-Linking Agent>

The cross-linking agent is preferably a compound having a carbodiimide group or an oxazoline group in the molecule, and more preferably, a copolymer having an acrylic moiety in the molecule.

The first white ink preferably contains a polymer having a carbodiimide group or an oxazoline group, because in this case, an effect of improving the fastness by a reaction with the resin contained in the second white ink is obtained. The first white ink preferably contains 1 mass % or more and 6 mass % or less of the polymer having a carbodiimide group or an oxazoline group. A cross-linking agent including a polymer having a carbodiimide group or oxazoline group can be used as the polymer having a carbodiimide group or an oxazoline group.

The physical properties of the ink are not particularly limited and may be appropriately selected according to a purpose. For example, the viscosity, the surface tension, pH, and the like are preferably within the following ranges.

The viscosity of the ink at 25° C. is preferably 5 mPa s or more and 30 mPa s or less, and more preferably 5 mPa s or more and 25 mPa s or less, from the viewpoint of improving the printing density and the character quality and obtaining good discharge properties. For example, the viscosity may be measured by a rotational viscometer (RE-80L, manufactured by Toki Sangyo Co., Ltd.). Regarding the measurement conditions, the viscosity may be measured at 25° C. with a standard cone rotor (1°34'×R24), a sample liquid amount of 1.2 mL, a rotation speed of 50 rpm, and a measurement time of 3 minutes.

Preferably, the surface tension of the ink at 25° C. is 35 mN/m or less, and more preferably 32 mN/m or less, so that the ink is suitably leveled on a recording medium and the drying time of the ink is shortened.

The pH of the ink is preferably from 7 to 12, and more preferably from 8 to 11, from the viewpoint of preventing corrosion of metal members in contact with the liquid.

<Pretreatment Liquid>

The pretreatment liquid contains an aggregating agent, an organic solvent, and water, and may further contain a surfactant, a defoaming agent, a pH adjuster, a preservative/fungicide, and a rust inhibitor, if desired.

Examples of the organic solvent, the surfactant, the defoaming agent, the pH adjuster, the preservative/fungicide, and the rust inhibitor include the same materials as the materials used for the ink and materials used in known treatment liquids.

The type of aggregating agent is not particularly limited. Examples of the aggregating agent include, but are not limited to, water-soluble cationic polymers, acids, and polyvalent metal salts.

Examples of the aggregating agent include, but are not limited to, polyvalent metal salts and cationic polymers. From the viewpoint of increasing the reactivity of the cross-linking agent, it is preferable to use an aggregating agent of which an aqueous solution has an acidic pH. The pH of the pretreatment liquid is preferably below 6.5.

To retain the first white ink on the surface of the fabric, the application amount of the pretreatment liquid is preferably 5 mg/cm$^2$ or more and 40 mg/cm$^2$ or less.

The ratio of the application amount of the pretreatment liquid per unit area to the application amount of the first white ink (i.e., pretreatment liquid/first white ink) is preferably 1.0 or more to retain the first white ink on the surface of the fabric, and preferably less than 7.5 to reduce stickiness of the image.

The ratio of the application amount of the second white ink per unit area to the application amount of the first white ink (i.e., second white ink/first white ink) is preferably 0.5 or more to develop color on the first white ink and improve the white concealing properties, and preferably 1.0 or less to ensure adhesiveness to the fabric and improve rubbing fastness.

<Post-Treatment Liquid>

A post-treatment liquid may be applied if desired.

The post-treatment liquid is not particularly limited as long as the post-treatment liquid forms a transparent layer. The post-treatment liquid may be obtained by selecting and mixing an organic solvent, water, a resin, a surfactant, a defoaming agent, a pH adjuster, a preservative/fungicide, and a rust inhibitor, as desired. The post-treatment liquid may be applied to the entire recording region formed on the recording medium or only to a region where an ink image is formed.

<Recorded Matter>

A recorded matter of the present embodiment is formed of a recording medium and an image formed on the recording medium by using the ink of the present embodiment.

The recorded matter may be obtained by recording using an inkjet recording apparatus and an inkjet recording method.

<Recording Apparatus and Recording Method>

The ink of the present embodiment can be suitably applied to various types of recording apparatuses employing an inkjet recording method, such as printers, facsimile machines, photocopiers, multifunction peripherals functioning as a printer/facsimile machine/photocopier, and three-dimensional object fabrication apparatuses.

In the present embodiment, the recording apparatus and the recording method respectively refer to an apparatus that discharges ink or various types of treatment liquids onto a recording medium and a method of recording by using the apparatus. The recording medium refers to a medium onto which the ink or the various types of treatment liquids can attach at least temporarily.

The recording apparatus includes not only a head that discharges ink, but may include means involved in feeding, conveying, and ejecting a recording medium, and may further include a device referred to as a pretreatment device, a post-treatment device, and the like.

The recording apparatus and the recording method may include heating means used in a heating step and drying means used in a drying step. Examples of the heating means and the drying means include, but are not limited to, means for heating and drying a printed surface and a rear surface of a recording medium. The heating means and the drying means are not particularly limited. Examples thereof include, but are not limited to, a warm air heater and an infrared heater. The heating process and the drying process may be performed before, during, or after printing.

The recording apparatus and the recording method are not limited to an apparatus and a method that visualize meaningful images, such as characters and figures, by using ink. For example, the recording apparatus and the recording method also include an apparatus and a method for forming patterns such as geometric patterns, and an apparatus and a method for fabricating three-dimensional images.

Unless otherwise specified, the recording apparatus includes both a serial-type apparatus in which a discharge head is moved and a line-type apparatus in which the discharge head is not moved.

The recording apparatus includes not only a desktop-type recording apparatus, but also includes a wide-width recording apparatus that can also print on a recording medium having A0 size, and for example, printers for continuous sheets in which a continuous sheet wound into a roll can be used as the recording medium.

Figure 1:
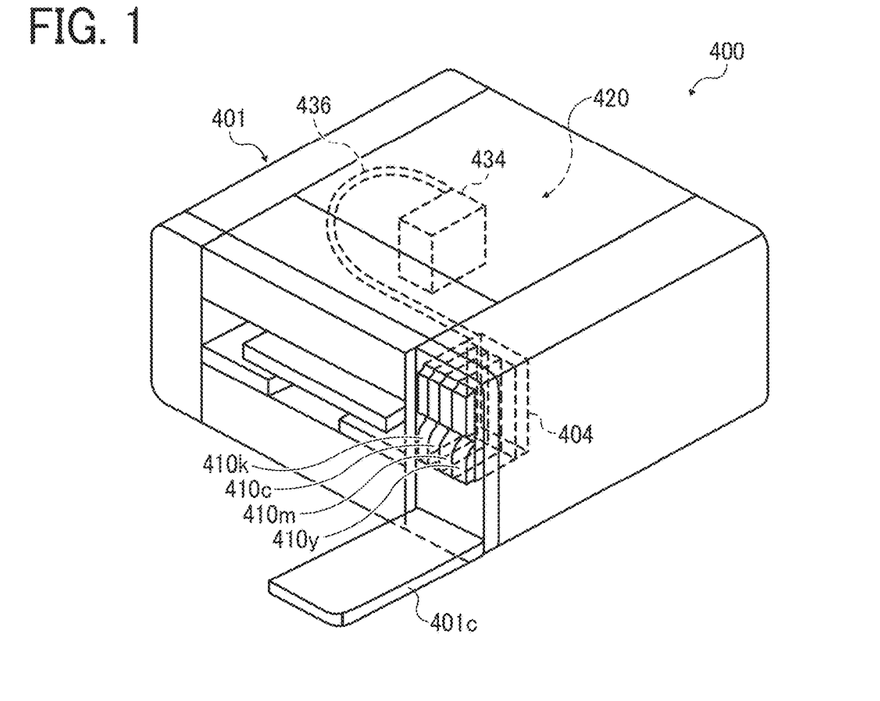
FIG. 1 is a perspective view of a recording apparatus used for implementing an inkjet recording method according to an embodiment of the present invention.
Figure 2:
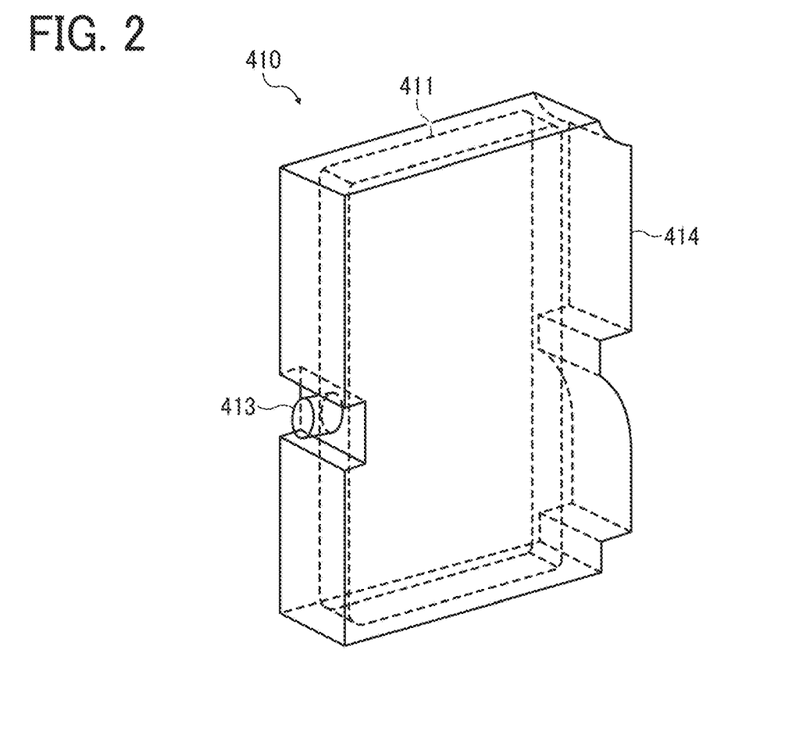
FIG. 2 is a perspective view of a main tank containing ink used in an inkjet recording method according to an embodiment of the present invention.

One example of the recording apparatus is described with reference to FIGS. 1 and 2. FIG. 1 is a perspective explanatory view of the recording apparatus. FIG. 2 is a perspective explanatory view of a main tank. An image forming apparatus 400 as an example of the recording apparatus is a serial-type image forming apparatus. A mechanical portion 420 is provided inside an exterior package 401 of the image forming apparatus 400. Main tanks 410 (410k, 410c, 410m, and 410y) for each color including black (K), cyan (C), magenta (M), and yellow (Y) each include an ink accommodating portion 411. The ink accommodating portion 411 is formed of a packaging member such as an aluminum laminate film, for example. The ink accommodating portion 411 is accommodated in a container accommodating case 414 formed of plastic. Thus, each of the main tanks 410 is used as an ink cartridge for a corresponding one of the colors.

Moreover, a cartridge holder 404 is provided on an inner side of an opening when a cover 401c of an apparatus main body is opened. The main tanks 410 are mounted attachably and detachably with respect to the cartridge holder 404. Thus, an ink discharge port 413 of each of the main tanks 410 communicates, via a supply tube 436 for each color, with a discharge head 434 for each color, so that the ink can be discharged from the discharge head 434 onto a recording medium.

The recording apparatus may not only include a portion that discharges ink, but also a device referred to as a pretreatment device, a post-treatment device, and the like.

In one aspect, similarly to the case where the ink includes black (K), cyan (C), magenta (M), and yellow (Y) inks, the pretreatment device and the post-treatment device may additionally include a liquid discharge head and a liquid accommodating portion including a pretreatment liquid or a post-treatment liquid, so that the pretreatment liquid and the post-treatment liquid are discharged by an inkjet recording method.

In another aspect of the pretreatment device and the post-treatment device, a pretreatment device and a post-treatment device using a method other than the inkjet recording method, such as a blade coating method, a roll coating method, and a spray coating method, are provided.

The ink may be applied not only to the inkjet recording method, but also to a wide range of other recording methods. Examples of methods other than the inkjet recording method include, but are not limited to, a blade coating method, a gravure coating method, a bar coating method, a roll coating method, a dip coating method, a curtain coating method, a slide coating method, a die coating method, and a spray coating method.

The applications of the ink of the present embodiment are not particularly limited and may be appropriately selected according to a purpose. For example, the ink can be used for printed materials, paints, coating materials, and foundations. The ink can be used not only as an ink for forming two-dimensional characters and images, but also as a three-dimensional fabrication material for forming three-dimensional images (three-dimensional fabricated objects).

The three-dimensional object fabrication apparatus for fabricating three-dimensional objects can be any known apparatus and is not particularly limited. For example, an apparatus having ink storage means, supply means, discharge means, and drying means can be used. The three-dimensional fabricated object includes a three-dimensional fabricated object obtained by applying ink in an overlaying manner. Further, the three-dimensional fabricated object also includes a molded product obtained by processing a structure body in which ink is applied to a recording medium such as a recording medium. For example, the molded product is obtained by subjecting a recorded matter or a structure body formed in a sheet shape or a film shape to a molding process such as a heat-drawing and punching process. The molded product is suitably used for applications in which a surface is to be molded after decoration, such as in automobiles, OA equipment, electric/electronic devices, meters such as cameras, and panels such as operation portions.

In the present disclosure, the terms "image formation", "recording", "character printing", and "printing" may be used synonymously with each other.

In the present disclosure, the terms "recording member", "recording medium", "recording media", "printing medium", and "recording base material" may be used synonymously with each other.

EXAMPLES

Embodiments of the present invention will be described below in more detail with reference to Examples, but the present invention is not limited to these Examples.

In the following description, the term "parts" refers to "parts by mass" and "%" refers to "mass %", unless specified otherwise.

<Preparation of Polymer Solution A>

A 1-L flask was equipped with a mechanical stirrer, a thermometer, a nitrogen gas inlet tube, a reflux tube, and a dropping funnel, and the air in the flask was sufficiently replaced with nitrogen gas. Subsequently, 11.2 g of styrene, 2.8 g of acrylic acid, 12.0 g of lauryl methacrylate, 4.0 g of polyethylene glycol methacrylate, 4.0 g of styrene macromer, and 0.4 g of mercaptoethanol were mixed in the flask and the temperature was increased to 65° C. Next, a mixed solution containing 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercaptoethanol, 2.4 g of azobis methylvaleronitrile, and 18 g of methyl ethyl ketone was added dropwise to the flask over a period of 2.5 hours. After that, a mixed solution containing 0.8 g of azobis methylvaleronitrile and 18 g of methyl ethyl ketone was added dropwise to the flask over a period of 0.5 hours.

After stirring for 1 hour at 65° C., 0.8 g of azobis methylvaleronitrile was added and the mixture was further stirred for 1 hour. After completion of the reaction, 364 g of methyl ethyl ketone was added to the flask. Thus, 800 g of [Polymer Solution A] having a concentration of 50% was obtained.

<Preparation of Polymer Fine Particle Dispersion Liquid Containing Black Pigment>

28 g of the polymer solution A, 42 g of Carbon Black (FW100 available from Degussa AG), 13.6 g of a 1 mol/L aqueous solution of potassium hydroxide, 20 g of methyl ethyl ketone, and 13.6 g of ion-exchanged water were sufficiently stirred, and then, kneaded by using a roll mill. The obtained paste was poured into 200 g of pure water, the mixture was sufficiently stirred, and then, methyl ethyl ketone and water were evaporated by using an evaporator. The obtained dispersion liquid was subjected to pressure filtration using a polyvinylidene fluoride membrane filter having an average pore diameter of 5.50 μm to remove coarse particles. Thus, a [polymer fine particle dispersion liquid containing a black pigment] having a pigment content of 15% and a solid content of 20% was obtained.

The particle diameter of polymer particles contained in the obtained [polymer fine particle dispersion liquid containing a black pigment] was measured as the cumulative 50% volume particle diameter $D_{50}$ by a particle size distribution analyzer (NANOTRAC UPA-EX150, manufactured by Nikkiso Co., Ltd.) and was 104 nm.

[Manufacturing of Color Ink]

A container was equipped with a stirrer, and 2.00 parts of 2-ethyl-1,3-hexanediol, 27.50 parts of glycerin, 5.00 parts of 3-methyl-1,3-butanediol, 0.50 parts of 2,5,8,11-tetramethyl-decane-5,8-diol, and 0.40 part of SILFACE SGA503A were added to the container and mixed and stirred for 30 minutes.

Next, 0.05 parts of a preservative/fungicide (PROXEL GXL, manufactured by Avecia Co., Ltd.), 0.20 parts of 2-amino-2-ethyl-1,3-propanediol, and 4.00 parts of the [polymer fine particle dispersion liquid containing a black pigment] in terms of solid content, 8.00 parts of polyurethane dispersion TAKELAC W-6110 in terms of solid content, and an amount of high-purity water to obtain 100 parts were added, and mixed and stirred for 60 minutes.

The obtained mixture was subjected to pressure filtration using a polyvinylidene fluoride membrane filter having an average pore diameter of 1.5 μm to remove coarse particles and waste, and thus, [Color Ink 1] (black ink) was obtained.

<Manufacturing of Polymer-Dispersed White Pigment Dispersion Liquid>

55.6 g of DISPERBYK-2081 (manufactured by BYK Japan Co., Ltd.) copolymer solution, 517 g of titanium oxide (TITONE R-25, manufactured by Sakai Chemical Industry Co., Ltd.), 50 g of 0-methoxy-N,N-dimethyl-propionamide, and 377.4 g of ion-exchanged water were sufficiently stirred, and then, filled into a bead mill (DYNO-MILL) to disperse the mixture until the cumulative 50% volume particle diameter D50 was 300 nm or less. The dispersion liquid was subjected to pressure filtration using a polyvinylidene fluoride membrane filter having an average pore diameter of 5.0 μm to remove coarse particles, and a polymer-dispersed white pigment dispersion liquid containing 50% white pigment was obtained.

The pigment particles contained in the obtained polymer-dispersed white pigment dispersion liquid were measured by a particle size distribution analyzer (NANOTRAC UPA-EX150, manufactured by Nikkiso Co., Ltd.) and the cumulative 50% volume particle diameter D50 was 283 nm.

(Materials for Preparing White Ink)

The materials used to prepare the first white ink and the second white ink are described below.

[Resin] Resins Corresponding to Resin Having Carboxy Group
 Urethane resin A: TAKELAC W-6110 (manufactured by Mitsui Chemicals, Inc.)
 Acrylic resin B: MOWINYL 6750 (manufactured by Japan Coating Resin Co., Ltd.)
 Urethane resin C: SUPERFLEX 460 (manufactured by Daiichi Kogyo Seiyaku Co., Ltd., glass transition temperature: −21° C.)
 Urethane resin D: SUPERFLEX 300 (manufactured by Daiichi Kogyo Seiyaku Co., Ltd., glass transition temperature: −42° C.)

[Organic Solvent]
 Glycerin
 Propylene glycol

[Cross-Linking Agent] Polymer Having Oxazoline Group
 Cross-linking agent A: K-2010E, amount of solid content 40%, manufactured by Nippon Shokubai Co., Ltd.
 Cross-linking agent B: WS-500, amount of solid content 39%, manufactured by Nippon Shokubai Co., Ltd.

[pH Adjuster]
2-amino-2-ethyl-1,3-propanediol [Defoaming Agent]
2,5,8,11-tetramethyldecane-5,8-diol [Surfactant]
SILFACE SAG503A (manufactured by Nissin Chemical Co., Ltd.)

[Preservative/Fungicide]
 PROXEL GXL (manufactured by Avecia Co., Ltd.)

<Preparation of First White Ink>

(Preparation of White Ink 1-1)

20.00 parts of glycerin and 0.40 parts of SILFACE SAG503A were placed in a container equipped with a stirrer, and mixed and stirred for 30 minutes.

Next, 0.05 parts of a preservative/fungicide (PROXEL GXL, manufactured by Avecia Co., Ltd.), 0.20 parts of 2-amino-2-ethyl-1,3-propanediol, 7.00 parts of the polymer-dispersed white pigment dispersion liquid in terms of solid content, 10.00 parts of the urethane resin A in terms of solid content, 4.00 parts of the cross-linking agent A, and an amount of high-purity water to obtain 100 parts were added, and mixed and stirred for 60 minutes.

The obtained mixture was subjected to pressure filtration using a polyvinylidene fluoride membrane filter having an average pore diameter of 1.5 μm to remove coarse particles and waste, and thus, the ink was obtained.

(Preparation of White Ink 1-2 and White Ink 1-3)

White ink 1-2 and white ink 1-3 were prepared similarly to white ink 1-1, except that the ink components in the preparation of white ink 1-1 were changed to the formulations presented in Table 1 below.

The pH of white ink 1-1 to white ink 1-3 was in a range from 8.0 or more to 10.0 or less.

TABLE 1

| Components of first white ink | First white ink No. | | |
|---|---|---|---|
| | 1-1 | 1-2 | 1-3 |
| Polymer-dispersed white pigment dispersion liquid (converted to solid content) | 7.00 | 7.00 | 7.00 |
| Urethane resin A (converted to solid content) | 10.00 | — | 10.00 |
| Acrylic resin B (converted to solid content) | — | 10.00 | — |
| Glycerin | 20.00 | — | 20.00 |
| Propylene glycol | — | 24.00 | — |
| Cross-linking agent A | 4.00 | — | — |
| Cross-linking agent B | — | 5.00 | — |
| 2-amino-2-ethyl-1,3-propanediol | 0.20 | 0.20 | 0.20 |
| SILFACE SAG503A | 0.40 | 0.40 | 0.40 |
| PROXEL GXL | 0.05 | 0.05 | 0.05 |
| Ion-exchanged water | Remaining part | Remaining part | Remaining part |
| pH | 8.7 | 8.8 | 8.7 |

<Manufacturing of Second White Ink>

(Preparation of White Ink 2-1)

20.00 parts of glycerin and 0.40 parts of SILFACE SAG503A were placed in a container equipped with a stirrer, and mixed and stirred for 30 minutes.

Next, 0.05 parts of a preservative/fungicide (PROXEL GXL, manufactured by Avecia Co., Ltd.), 0.20 parts of 2-amino-2-ethyl-1,3-propanediol, 7.00 parts of the polymer-dispersed white pigment dispersion liquid in terms of solid content, 10.00 parts of the urethane resin C in terms of solid content, and an amount of high-purity water to obtain 100 parts were added, and mixed and stirred for 60 minutes.

The obtained mixture was subjected to pressure filtration using a polyvinylidene fluoride membrane filter having an average pore diameter of 1.5 μm to remove coarse particles and waste, and thus, the ink was obtained.

(Preparation of White Ink 2-2 to White Ink 2-4)

White ink 2-2 to white ink 2-4 were prepared similarly to white ink 2-1, except that the ink components in the preparation of white ink 2-1 were changed to the formulations presented in Table 2 below.

TABLE 2

| Components of second white ink | Second white ink No. | | | |
|---|---|---|---|---|
| | 2-1 | 2-2 | 2-3 | 2-4 |
| Polymer-dispersed white pigment dispersion liquid (converted to solid content) | 7.00 | 7.00 | 7.00 | 7.00 |
| Urethane resin C (converted to solid content) | 10.00 | 14.00 | 8.00 | — |
| Urethane resin D (converted to solid content) | — | — | — | 12.00 |
| Glycerin | 20.00 | — | 20.00 | — |
| Propylene glycol | — | 22.00 | — | 22.00 |
| 2-amino-2-ethyl-1,3-propanediol | 0.20 | 0.20 | 0.20 | 0.20 |
| SILFACE SAG503A | 0.40 | 0.40 | 0.40 | 0.40 |
| PROXEL GXL | 0.05 | 0.05 | 0.05 | 0.05 |
| Ion-exchanged water | Remaining part | Remaining part | Remaining part | Remaining part |

(Materials for Preparing Pretreatment Liquid)

The materials used to prepare the pretreatment liquid are described below.

[Polyvalent Metal Salt]
  Calcium nitrate tetrahydrate (manufactured by Fujifilm Wako Pure Chemical Corporation)
  Calcium chloride (manufactured by Fujifilm Wako Pure Chemical Corporation)
  Sodium carbonate (manufactured by Fujifilm Wako Pure Chemical Corporation)

[Organic Solvent]
  Propylene glycol [Defoaming Agent]
  2,5,8,11-tetramethyldecane-5,8-diol [Surfactant]
  SILFACE SAG-503A [Preservative/Fungicide]
  PROXEL GXL (manufactured by Avecia Co., Ltd.)

<Manufacturing of Pretreatment Liquid>

The polyvalent metal salts presented in Table 3 below were weighed in the amounts indicated in Table 3 in a glass beaker, added to 30.00 parts of high-purity water, and the obtained mixture was stirred for 5 minutes. Next, 20.00 parts of propylene glycol, 0.50 parts of 2,5,8,11-tetramethyldecane-5,8-diol, 0.40 parts of SILFACE SAG503A, and 0.05 parts of PROXEL GXL were added, and the obtained mixture was stirred for 15 minutes. After that, high-purity water was added to obtain 100 parts in total, and the mixture was mixed and stirred for 10 minutes. The stirred liquid was filtered using a nylon mesh of #200 mesh to obtain pretreatment liquids 1 to 4 used in the Examples and Comparative Examples.

Example 1

The pretreatment liquid 1, the white ink 1-1, the white ink 2-1, and the color ink 1 were used in the application amounts indicated in Table 4 to form an image by the inkjet recording method illustrated in FIG. 3, and the image was evaluated.

An image forming method and an image evaluation method will be described later.

Examples 2 to 10 and Comparative Examples 1 to 6

An image was formed similarly to Example 1, except that the pretreatment liquid, the first white ink, the second white ink, and the color ink indicated in Table 4 were used, and the application amounts of these materials were selected as indicated in Table 4. The obtained image was evaluated.

[Image Forming Method]

An inkjet printer [Direct to Garment Printer RICOH Ri 2000, manufactured by RICOH Co., Ltd.] under environmental conditions adjusted to 23° C.±0.5° C. and 50%±5% RH was used and set to apply ink in the application amounts indicated in Table 4 to the recording media.

First, the pretreatment liquids indicated in Table 3, the first white ink indicated in Table 1, the second white ink indicated in Table 2, and color ink were applied in this order by Ri 2000 in the application amounts listed in Table 4 to a fabric (Glimmer 00300-ACT Black (manufactured by TOMS Co., Ltd.)). In a case where the WOW method was used as the application method of the first white ink, no drying step was included after the pretreatment liquid appli-

TABLE 3

| Components of pretreatment liquid | Pretreatment liquid No. | | | |
|---|---|---|---|---|
| | 1 | 2 | 3 | 4 |
| Calcium chloride | 15.00 | — | — | — |
| Calcium nitrate tetrahydrate | — | 20.00 | 30.00 | — |
| Sodium carbonate | — | — | — | 30.00 |
| Propylene glycol | 20.00 | 20.00 | 18.00 | 20.00 |
| 2,5,8,11-tetramethyldecane-5,8-diol | 0.50 | 0.50 | 0.50 | 0.50 |
| SILFACE SAG503A | 0.40 | 0.40 | 0.40 | 0.40 |
| PROXEL GXL | 0.05 | 0.05 | 0.05 | 0.05 |
| Ion-exchanged water | Remaining part | Remaining part | Remaining part | Remaining part |
| pH | 9.0 | 6.2 | 5.5 | 11.6 | cation step. In a case where a WET ON DRY (WOD) method was used, after applying the pretreatment liquid, a drying step was performed for 90 seconds by using a heat press machine at 130° C. (THE MAXX PRESS (manufactured by STAHLS Inc.)). A dark-colored polyester T-shirt obtained after image formation was dried in an oven at 130° C. for 3 minutes.

For each obtained image, the Hunter whiteness (white concealing properties), dry rubbing fastness, and stickiness were evaluated as described below. The results are presented in Table 5.

<Hunter Whiteness>

A spectrophotometer (X-rite exact, manufactured by X-rite, Inc.) was used to measure the image density of a solid white part in each obtained image, and the Hunter whiteness (W) was calculated by Equation (1) below.

$$W = 100 - [(100-L)^2 + (a^2+b^2)]^{1/2} \quad (1)$$

(where L, a, and b in the equation respectively represent an L value (brightness), an a value (redness), and a b value (yellowness))

To measure the image density, the evaluation sample was placed on top of five layers of black paper (high-quality colored paper, medium thickness, black (manufactured by Hokuetsu Corporation).

<Dry Rubbing Fastness>

Each of the obtained printed materials was subjected to a rubbing resistance test by using a dyed material rubbing fastness tester AR-2 (manufactured by Intec Inc.). In the method, a metal cloth was put on an image surface and used to rub the image surface with a load of 200 g. In each image, an image portion rubbed with the metal cloth was visually evaluated. It is noted that C or higher indicates a level at which a sample can be used in practice.

[Evaluation Criteria]
A: Good
B: Color detaches slightly
C: Color detaches somewhat visibly
D: Color detaches visibly
E: Color peels visibly <Stickiness>

An image portion was touched with a bare hand to perform sensory evaluation according to the evaluation criteria described below. An evaluation result of B or higher indicates a level at which a sample can be used in practice.

[Evaluation Criteria]
A: Good
B: Some liquid is transferred onto the hand
B: Liquid is transferred onto the hand

TABLE 4

| Example/Comparative Example | Pretreatment Liquid — Pretreatment liquid No. | Pretreatment Liquid — Application amount (mg/cm²) | First white ink — White ink No. | First white ink — Application amount (mg/cm²) | Second white ink — White ink No. | Second white ink — Application amount (mg/cm²) | Ratio of application amounts — Pretreatment liquid/First white ink | Ratio of application amounts — Second white ink/First white ink | Application method of white ink | Color ink — Color ink No. | Color ink — Application amount (mg/cm²) |
|---|---|---|---|---|---|---|---|---|---|---|---|
| Example 1 | 1 | 5 | 1-1 | 10 | 2-1 | 10 | 0.5 | 1.0 | WOW | 1 | 2.1 |
| Example 2 | 3 | 15 | 1-1 | 10 | 2-1 | 10 | 1.5 | 1.0 | WOW | 1 | 2.1 |
| Example 3 | 1 | 5 | 1-1 | 10 | 2-1 | 7.5 | 0.5 | 0.8 | WOW | 1 | 2.1 |
| Example 4 | 2 | 75 | 1-2 | 10 | 2-2 | 5 | 7.5 | 0.5 | WOW | 1 | 2.1 |
| Example 5 | 2 | 22 | 1-3 | 15 | 2-2 | 10 | 1.5 | 0.7 | WOW | 1 | 2.1 |
| Example 6 | 3 | 15 | 1-1 | 10 | 2-3 | 10 | 1.5 | 1.0 | WOW | 1 | 2.1 |
| Example 7 | 2 | 15 | 1-1 | 14 | 2-4 | 13 | 1.1 | 0.9 | WOW | 1 | 2.1 |
| Example 8 | 3 | 20 | 1-2 | 10 | 2-2 | 10 | 2.0 | 1.0 | WOW | 1 | 2.1 |
| Example 9 | 2 | 10 | 1-2 | 7.5 | 2-1 | 7 | 1.3 | 0.9 | WOW | 1 | 2.1 |
| Example 10 | 3 | 12 | 1-1 | 12 | 2-2 | 11 | 1.0 | 0.9 | WOW | 1 | 2.1 |
| Comparative Example 1 | — | — | 1-1 | 20 | 2-1 | 20 | — | 1.0 | — | 1 | 2.1 |
| Comparative Example 2 | 4 | 80 | 1-1 | 10 | 2-1 | 10 | 8.0 | 1.0 | WOD | 1 | 2.1 |
| Comparative Example 3 | 2 | 10 | 1-2 | 10 | 2-2 | 20 | 1.0 | 2.0 | WOD | 1 | 2.1 |
| Comparative Example 4 | 1 | 30 | 1-3 | 10 | 2-2 | 20 | 3.0 | 2.0 | WOD | 1 | 2.1 |
| Comparative Example 5 | 1 | 20 | 1-2 | 20 | 2-3 | 18 | 1.0 | 0.9 | WOD | 1 | 2.1 |
| Comparative Example 6 | 1 | 20 | 1-1 | 10 | 2-4 | 15 | 2.0 | 1.5 | WOD | 1 | 2.1 |

The Hunter whiteness was evaluated according to the evaluation criteria described below.

It is noted that C or higher indicates a level at which a sample can be used in practice.

[Evaluation Criteria]
A: Hunter whiteness of 85 or more
B: Hunter whiteness of 80 or more and less than 85
C: Hunter whiteness of 75 or more and less than 80
D: Hunter whiteness of 70 or more and less than 75
E: Hunter whiteness of less than 70

TABLE 5

| Example/Comparative Example | White concealing properties | Rubbing fastness | Stickiness |
|---|---|---|---|
| Example 1 | B | C | A |
| Example 2 | C | C | B |
| Example 3 | C | B | A |
| Example 4 | C | B | B |
| Example 5 | A | C | B |
| Example 6 | A | B | A |
| Example 7 | A | B | A |

TABLE 5-continued

| Example/Comparative Example | White concealing properties | Rubbing fastness | Stickiness |
|---|---|---|---|
| Example 8 | A | A | A |
| Example 9 | A | A | A |
| Example 10 | A | A | A |
| Comparative Example 1 | E | B | B |
| Comparative Example 2 | B | D | C |
| Comparative Example 3 | D | D | A |
| Comparative Example 4 | C | E | B |
| Comparative Example 5 | D | D | B |
| Comparative Example 6 | D | D | A |

For example, aspects of the present embodiment are described below.

In a first aspect, an inkjet recording method includes:
applying a pretreatment liquid to a fabric;
applying a first white ink by an inkjet method and a wet on wet method onto an application region of the pretreatment liquid obtained in the applying of the pretreatment liquid, to form an image;
applying a second white ink by an inkjet method and a wet on wet method onto the image formed in the applying of the first white ink; and
applying a color ink by an inkjet method and a wet on wet method onto an image obtained in the applying of the second white ink.

According to a second aspect, in the inkjet recording method according to the first aspect, an application amount of the pretreatment liquid is 5 mg/cm$^2$ or more and 40 mg/cm$^2$ or less, and a ratio of an application amount of the pretreatment liquid per unit area to an application amount of the first white ink is 1.0 or more and less than 7.5.

According to a third aspect, in the inkjet recording method according to the first aspect or the second aspect, the pretreatment liquid has a pH of less than 6.5.

According to a fourth aspect, in the inkjet recording method according to any one of the first to third aspects, a ratio of an application amount of the second white ink per unit area to the application amount of the first white ink per unit is 0.5 or more and 1.0 or less.

According to a fifth aspect, in the inkjet recording method according to any one of the first to fourth aspects, the first white ink contains 1 mass % or more and 6 mass % or less of a polymer having a carbodiimide group or an oxazoline group.

According to a sixth aspect, in the inkjet recording method according to any one of the first to fifth aspects, the second white ink contains a resin having a carboxy group.

According to a seventh aspect, in the inkjet recording method according to any one of the first to sixth aspects, the first white ink has a pH of 8.0 or more and 10.0 or less.

According to an eighth aspect, in the inkjet recording method according to any one of the first to seventh aspects, the second white ink contains 10 mass % or more and 14 mass % or less of a urethane resin.

According to a ninth aspect, in the inkjet recording method according to the eighth aspect, a dried ink film of the second white ink has a glass transition temperature of 30° C. or lower.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An inkjet recording method comprising:
applying a pretreatment liquid to a fabric;
applying a first white ink by an inkjet method and a wet on wet method onto an application region of the pretreatment liquid obtained in the applying of the pretreatment liquid, to form an image;
applying a second white ink by an inkjet method and a wet on wet method onto the image formed in the applying of the first white ink; and
applying a color ink by an inkjet method and a wet on wet method onto an image obtained in the applying of the second white ink;
wherein an application amount of the pretreatment liquid is 5 mg/cm$^2$ or more and 40 mg/cm$^2$ or less, and
a ratio of the application amount of the pretreatment liquid per unit area to an application amount of the first white ink is 1.0 or more and less than 7.5.

2. The inkjet recording method according to claim 1, wherein the pretreatment liquid has a pH of less than 6.5.

3. The inkjet recording method according to claim 1, wherein a ratio of an application amount of the second white ink per unit area to an application amount of the first white ink per unit area is 0.5 or more and 1.0 or less.

4. The inkjet recording method according to claim 1, wherein the first white ink comprises 1 mass % or more and 6 mass % or less of a polymer having a carbodiimide group or an oxazoline group.

5. The inkjet recording method according to claim 1, wherein the second white ink comprises a resin having a carboxy group.

6. The inkjet recording method according to claim 1, wherein the first white ink has a pH of 8.0 or more and 10.0 or less.

7. The inkjet recording method according to claim 1, wherein the second white ink contains 10 mass % or more and 14 mass % or less of a urethane resin.

8. The inkjet recording method according to claim 1, wherein a dried ink film of the second white ink has a glass transition temperature of 30° C. or lower.

* * * * *